US012359793B2

(12) United States Patent
Wu et al.

(10) Patent No.: US 12,359,793 B2
(45) Date of Patent: Jul. 15, 2025

(54) LIGHTING APPARATUS

(71) Applicant: LEEDARSON LIGHTING FIXTURES CO., LTD, Fujian (CN)

(72) Inventors: Chenjun Wu, Fujian (CN); Ping Yan, Fujian (CN); Jinglong Chen, Fujian (CN); Zhenhong Zhu, Fujian (CN)

(73) Assignee: LEEDARSON LIGHTING FIXTURES CO., LTD, Fujian (CN)

( * ) Notice: Subject to any disclaimer, the term of this patent is extended or adjusted under 35 U.S.C. 154(b) by 0 days.

(21) Appl. No.: 18/745,771

(22) Filed: Jun. 17, 2024

(65) Prior Publication Data

US 2024/0418345 A1 Dec. 19, 2024

(30) Foreign Application Priority Data

Jun. 15, 2023 (CN) ........................ 202321533723.9

(51) Int. Cl.

| | |
|---|---|
| ***F21V 7/04*** | (2006.01) |
| ***F21S 8/04*** | (2006.01) |
| ***F21V 1/12*** | (2006.01) |
| ***F21V 23/00*** | (2015.01) |
| ***F21Y 115/10*** | (2016.01) |
| ***H05B 45/10*** | (2020.01) |
| ***H05B 47/17*** | (2020.01) |

(52) U.S. Cl.
CPC ................ *F21V 7/041* (2013.01); *F21S 8/04* (2013.01); *F21V 1/12* (2013.01); *F21V 23/005* (2013.01); *H05B 45/10* (2020.01); *H05B 47/17* (2020.01); *F21Y 2115/10* (2016.08)

(58) Field of Classification Search
CPC ........... F21V 7/041; F21K 9/232; F21K 9/238
USPC ........................................................ 362/235
See application file for complete search history.

(56) References Cited

U.S. PATENT DOCUMENTS

2013/0229801 A1* 9/2013 Breidenassel ......... F21V 29/505 362/235

* cited by examiner

*Primary Examiner* — Laura K Tso
(74) *Attorney, Agent, or Firm* — Chun-Ming Shih; LANWAY IPR SERVICES

(57) ABSTRACT

A lighting apparatus includes a first light source, a second light source, a light source plate and a separating wall. The light source plate has a first area and a second area on a front side of the light source plate. The first light source is placed on the first area of the light source plate. The second light source is placed on the second area of the light source plate. The separating wall is placed above the front side of the light source plate for separating the first area and the second area and for defining a first light spanning area of the first light source and a second light spanning of the second light source.

18 Claims, 12 Drawing Sheets

LIGHTING APPARATUS

FIELD

The present invention is related to a lighting apparatus, and more particularly related to a lighting apparatus with multiple flexible functions.

BACKGROUND

LED (Light Emitting Diode) technology has undergone significant development since its inception in the early 20th century. The first practical LED was developed in 1962 by Nick Holonyak Jr., a scientist at General Electric. Initially, LEDs were limited to emitting low-intensity red light and were used primarily as indicator lights in electronic devices. These early LEDs were inefficient and expensive, which restricted their applications. However, the fundamental principle of electroluminescence, where materials emit light in response to an electric current, laid the groundwork for future advancements.

Throughout the 1970s and 1980s, improvements in materials and manufacturing techniques led to the development of LEDs that could emit light in different colors, including green and yellow. These advancements were driven by the discovery and utilization of new semiconductor materials like gallium phosphide and gallium arsenide. Concurrently, researchers worked on enhancing the efficiency and brightness of LEDs, making them more suitable for practical applications. By the late 1980s, LEDs were being used in digital displays, traffic lights, and signage, though they were still not efficient enough for widespread lighting applications.

The breakthrough that revolutionized LED technology came in the 1990s with the development of blue LEDs by Shuji Nakamura and his colleagues. Using gallium nitride (GaN) and indium gallium nitride (InGaN) as the semiconductor materials, they were able to create high-brightness blue LEDs. This innovation was crucial because it enabled the creation of white light LEDs by combining blue LEDs with phosphors that convert blue light to white light. This breakthrough not only expanded the range of applications for LEDs but also paved the way for their use in general lighting.

As the 21st century progressed, LED technology continued to evolve rapidly. Advances in materials science, particularly the development of more efficient phosphors and quantum dot technologies, have significantly improved the color rendering and efficiency of LEDs. Additionally, improvements in manufacturing processes, such as the development of epitaxial growth techniques and surface coating technologies, have reduced production costs and increased the durability of LEDs. These enhancements have made LEDs the preferred choice for a wide range of applications, from residential and commercial lighting to automotive and outdoor lighting.

Today, LED technology is at the forefront of the lighting industry, driven by its energy efficiency, long lifespan, and versatility. LEDs consume significantly less energy compared to traditional incandescent and fluorescent bulbs, resulting in lower electricity bills and reduced environmental impact. Their long operational life, often exceeding 50,000 hours, reduces the need for frequent replacements, further contributing to their cost-effectiveness and sustainability. The versatility of LEDs allows for innovative lighting solutions, including smart lighting systems that can be controlled remotely and integrated into smart home ecosystems.

Looking ahead, the future of LED technology is promising, with ongoing research focusing on enhancing efficiency, reducing costs, and expanding applications. Emerging technologies such as organic LEDs (OLEDs) and micro-LEDs are poised to further transform the lighting and display industries. OLEDs, known for their flexibility and ability to produce high-quality, vibrant displays, are being used in advanced televisions and smartphones. Micro-LEDs, with their potential for higher brightness and energy efficiency, are expected to revolutionize display technology. As LED technology continues to evolve, it will play a crucial role in addressing global challenges related to energy consumption and sustainability.

Due to its numerous advantages, LED technology is rapidly replacing traditional light sources such as incandescent and fluorescent bulbs. One of the key features driving this replacement is energy efficiency. LEDs use significantly less electricity to produce the same amount of light as traditional bulbs, which translates to substantial energy savings. This efficiency is particularly important in large-scale applications, such as street lighting and commercial buildings, where the cumulative energy savings can be immense. Additionally, LEDs generate very little heat compared to incandescent bulbs, which convert much of their energy into heat rather than light. This not only makes LEDs safer and cooler to touch but also reduces the load on air conditioning systems, leading to further energy savings.

Another crucial feature of LED technology is its long lifespan. LEDs can last up to 25 times longer than traditional incandescent bulbs and about three to five times longer than compact fluorescent lamps (CFLs). This extended lifespan significantly reduces maintenance costs and the frequency of replacements. For businesses and municipalities, this means fewer disruptions and lower labor costs associated with changing bulbs. In residential settings, it translates to convenience and cost savings for homeowners. The long life of LEDs also contributes to environmental sustainability by reducing the number of bulbs that end up in landfills.

LEDs offer unparalleled versatility and design flexibility, which has expanded their use in a wide variety of lighting devices. Their small size and ability to be integrated into compact and innovative designs make them ideal for applications where traditional bulbs would be impractical. For example, LEDs are extensively used in automotive lighting, including headlights, tail lights, and interior lights, due to their durability, energy efficiency, and ability to produce bright, focused light. In the entertainment industry, LEDs are used in stage lighting, displays, and screens, offering vibrant colors and dynamic lighting effects that enhance performances and visual experiences.

In the realm of smart lighting, LEDs are a natural fit due to their compatibility with digital controls. Smart LED bulbs can be controlled remotely via smartphones or integrated into smart home systems, allowing users to adjust brightness, color, and timing according to their preferences. This capability not only adds convenience and customization but also contributes to energy efficiency through features like automatic dimming and motion detection. Moreover, the ability to control LED lighting remotely and programmatically makes them ideal for applications in smart cities, where streetlights and public lighting can be managed centrally to optimize energy use and maintenance schedules.

The environmental benefits of LED technology extend beyond energy efficiency and long lifespan. LEDs are free of hazardous materials such as mercury, which is present in fluorescent bulbs, making them safer for both users and the environment. Their reduced energy consumption means lower greenhouse gas emissions from power plants, contributing to efforts to combat climate change. Additionally, the development of recycling programs specifically for LEDs is making it easier to dispose of them responsibly, further minimizing their environmental impact.

Overall, the features of LED technology—energy efficiency, long lifespan, versatility, and environmental friendliness—have made them the preferred choice for a wide range of lighting applications. From residential homes to commercial buildings, public infrastructure to personal devices, LEDs are becoming ubiquitous. As technology continues to advance, the integration of LEDs into various lighting devices and systems will only increase, driving further innovations and benefits. This widespread adoption of LED technology marks a significant shift in the lighting industry, promising a more sustainable and efficient future.

LED panel lights have become increasingly popular in a variety of settings, including restaurants, living rooms, and commercial environments, due to their ability to provide soft, even lighting. These fixtures consist of an array of LEDs mounted on a flat panel that diffuses the light, creating a smooth and uniform glow that reduces glare and shadows. This quality of light is particularly desirable in spaces where comfort and ambiance are important, such as dining areas and living spaces. In commercial environments, the consistent and high-quality light from LED panels enhances visibility and productivity while maintaining a pleasing aesthetic.

One of the standout features of LED panel lights is their sleek, low-profile design, which allows them to be seamlessly integrated into ceilings and walls. This modern look is not only visually appealing but also saves space and makes the fixtures less obtrusive. The slim design of LED panel lights is ideal for environments with low ceilings or where a minimalist appearance is desired. Additionally, these lights often come in various shapes and sizes, offering flexibility in design and installation to suit different architectural styles and spatial requirements.

Despite the advantages of LED panel lights, there is a growing demand for even more flexible configurations to meet diverse lighting needs. People are increasingly looking for lighting solutions that can be customized and adjusted to fit their specific preferences and requirements. This has led to the development of panel lights with adjustable color temperatures and brightness levels. By incorporating tunable white technology, users can change the color temperature from warm to cool white, adapting the lighting to different activities and times of day. Dimmable options allow for control over light intensity, providing the right amount of light for any setting or mood.

In addition to adjustable lighting, smart technology is playing a significant role in enhancing the flexibility of LED panel lights. Smart panel lights can be controlled via remote controls, smartphone apps, or integrated into smart home systems. This allows users to create and save different lighting scenes, set schedules, and even automate lighting based on occupancy or natural light levels. In commercial environments, smart controls can optimize energy usage and enhance the lighting experience for employees and customers alike. For instance, in a restaurant, different lighting scenes can be programmed for lunch, dinner, and special events, creating the perfect ambiance for each occasion.

Modular designs are another innovation addressing the need for flexible configurations. Modular LED panel lights can be combined and arranged in various patterns to create custom lighting solutions. This adaptability is particularly useful in commercial environments where lighting needs may change over time or vary across different areas of a building. For example, in an office, modular panels can be reconfigured to accommodate changes in layout or function, ensuring that each workspace is optimally lit. Similarly, in retail settings, modular panels can highlight different product displays or create distinct zones within a store.

The continued evolution of LED panel light technology is driven by the desire to provide more personalized and adaptable lighting solutions. As manufacturers respond to consumer demand, we can expect to see further advancements in features such as color rendering, energy efficiency, and user-friendly controls. Innovations like dynamic daylight simulation, which mimics natural light patterns to support human circadian rhythms, and integration with other smart building systems will enhance the functionality and appeal of LED panel lights. By meeting the diverse needs of users in various settings, LED panel lights are set to remain a versatile and essential component of modern lighting design.

The prevalence of light-emitting devices in modern life cannot be overstated. From residential homes to commercial establishments, public infrastructure to personal gadgets, lighting solutions play a critical role in our daily activities and overall well-being. With the widespread adoption of light devices, even a small advancement in their technology or design can lead to significant improvements and widespread impact. These improvements not only enhance the functionality and user experience but also contribute to energy efficiency, cost savings, and environmental sustainability.

Given the extensive use of lighting devices, continuous innovation in this field is crucial. A key area of focus is the flexibility of lighting solutions. Users increasingly demand lighting systems that can be tailored to their specific needs and preferences. This includes the ability to adjust brightness and color temperature, customize lighting scenes, and integrate with smart home systems. Flexible lighting solutions can enhance comfort, productivity, and mood, making them highly desirable in various settings such as homes, offices, and public spaces.

In addition to flexibility, the functional capabilities of lighting devices are paramount. Modern lighting systems are expected to do more than just illuminate a space. They should support various activities, improve safety and security, and contribute to aesthetic appeal. For instance, in commercial environments, lighting can enhance the shopping experience or increase productivity in the workplace. In public spaces, intelligent lighting systems can provide dynamic illumination that responds to environmental conditions and user movement, improving safety and energy efficiency.

Cost is another critical factor in the development of lighting technologies. As lighting devices are ubiquitous, cost-effective solutions can lead to substantial savings for consumers and businesses alike. Advances that reduce the manufacturing and operational costs of lighting systems without compromising performance are highly beneficial. This includes innovations in materials, production processes, and energy consumption. Lower costs can accelerate the adoption of advanced lighting technologies, making them accessible to a broader range of users and applications.

Robustness and durability are essential considerations for lighting devices, especially in demanding environments. Lighting systems must withstand various conditions, including fluctuations in temperature, humidity, and mechanical stress. Enhancing the robustness of lighting devices ensures their longevity and reliability, reducing maintenance costs and minimizing disruptions. This is particularly important for applications in industrial settings, outdoor lighting, and critical infrastructure where consistent performance is crucial.

Ultimately, the pursuit of innovation in lighting technology involves a holistic approach that considers multiple factors: flexibility, functionality, cost, and robustness. By addressing these aspects, new advancements can bring about substantial improvements in human life. Enhanced lighting solutions can provide better quality of life through improved comfort and aesthetics, greater efficiency through reduced energy consumption and costs, and increased safety and productivity. As such, ongoing research and development in this field are not only beneficial but essential to harnessing the full potential of lighting technology to meet the evolving needs of society.

SUMMARY

In some embodiments, a lighting apparatus includes a first light source, a second light source, a light source plate and a separating wall.

The light source plate has a first area and a second area on a front side of the light source plate.

The first light source is placed on the first area of the light source plate.

The second light source is placed on the second area of the light source plate.

The separating wall is placed above the front side of the light source plate for separating the first area and the second area and for defining a first light spanning area of the first light source and a second light spanning of the second light source.

In some embodiments, the separating wall has a reflection on an inner side facing to the first light source.

In some embodiments, a main housing encloses the light source plate, and the separating wall.

The main housing has a first light opening and a second light opening.

The first light opening is substantially perpendicular to the second light opening.

In some embodiments, a second light of the second light source escapes through the second light opening.

The second light opening is disposed at a surrounding side wall of the main housing.

In some embodiments, a light cover covers the first light opening.

In some embodiments, a lens ring disposed on peripheral edge of the light cover for condensing a second light of the second light to form a illumination ring on the light cover.

In some embodiments, the light cover has an optical structure distribution to smooth an overlapping area of a first light of the first light source and a second light of the second light source.

In some embodiments, a light intensity difference on any two area of the light cover is less than a light intensity of the first light of the light source.

In some embodiments, particles in the plastic material of the light cover have different ratios at different locations of the light cover to form the optical structure distribution.

In some embodiments, the lighting apparatus may also include a controller for switching among a first mode, a second mode, and a third mode.

In the first mode, the controller only activates the first light source.

In the second mode, the controller only activates the second light source.

In the third mode, the controller activates both the first light source and the second light source.

In some embodiments, in the third mode, the controller enables the first light source to generate a first light at a first light intensity, and enables the second light source to generate a second light at a second light intensity.

A difference between the first light intensity and the second light intensity is less than 20% of the first light intensity.

In some embodiments, in the third mode, a first color temperature of the first light of the first light source is substantially the same as a second color temperature of the second light of the second light source.

In the first mode and the second mode, the first color temperature of the first light of the first light source is different form the second color temperature of the second light of the second light source.

In some embodiments, the separating wall controls a first light of the first light source to a first spanning area.

The separating wall controls a second light of the second source to a second spanning area.

The second spanning area encloses the first spanning area.

In some embodiments, an overlapping area of the first spanning area and the second spanning area is a third spanning area.

A controller controls driving currents to the first light source and the second light source to keep light intensity levels of the first spanning area, the second spanning area and the third spanning area within an intensity range.

In some embodiments, the intensity range is less than 20% of the light intensity of the first light source.

In some embodiments, the separating wall has a top edge and a bottom edge.

The bottom edge is attached to the light source plate.

The separating wall extends from the bottom edge to the top edge with an enlarging profile.

In some embodiments, the slope becomes more smooth from the bottom edge to the top edge in the enlarging profile.

In some embodiments, the lighting apparatus may also include a driver module disposed at center of the light source plate for generating driving currents to the first light source and the second light source.

In some embodiments, a driver housing covers the driver module.

An exterior surface of the driver housing has a reflective layer facing to the first light source.

In some embodiments, a bottom edge of a driver side wall of the driver housing is larger than a top edge of the driver side wall of the driver housing.

DETAILED DESCRIPTION

Figure 7:
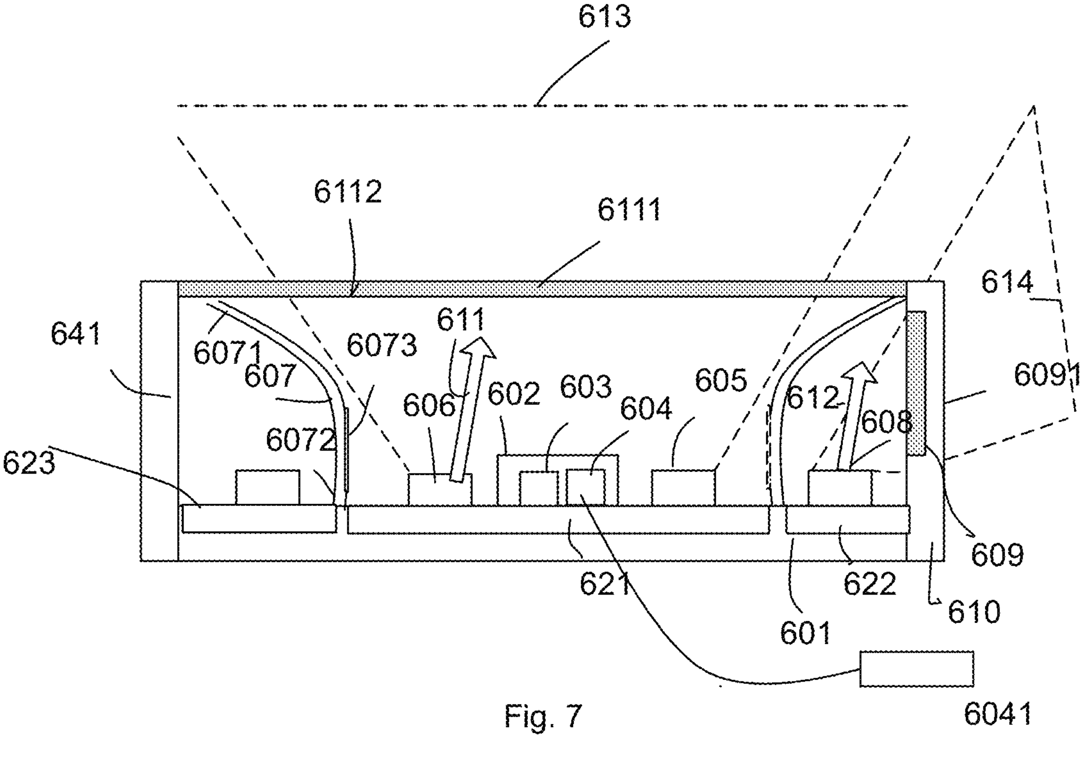
FIG. 7 shows another embodiment.

In FIG. 7, a lighting apparatus includes a first light source 605, a second light source 608, a light source plate 601 and a separating wall 607.

The light source plate 607 has a first area 621 and a second area 622 on a front side 623 of the light source plate 601.

The first light source 605 is placed on the first area 621 of the light source plate 601. The first light source 605 may include multiple LED modules 606 of different optical parameters. With such design, the first light source 605 may be controlled to generate different required light parameters, e.g. with different colors or different color temperatures.

The second light source 608 is placed on the second area 622 of the light source plate 601. There will be more examples with more detailed illustration to show that one type of embodiments is that the second area 622 surrounds the first area 601 from a top above the main plane of the light source plate 601.

The separating wall 607 is placed above the front side 623 of the light source plate 601 for separating the first area 621 and the second area 622 and for defining a first light spanning area 613 of the first light source 605 and a second light spanning area 614 of the second light source 608.

In some embodiments, the separating wall 607 has a reflection layer 6073 on an inner side facing to the first light source 605.

In some embodiments, a main housing 641 encloses the light source plate 601, and the separating wall 607.

The main housing 641 has a first light opening 6111 and a second light opening 609.

The first light opening 6111 is substantially perpendicular to the second light opening 609. This example shows an absolute perpendicular case, but it should be interpreted as covering the two edges that may have a relative angle between 60 to 130 degrees.

In some embodiments, a second light 612 of the second light source escapes through the second light opening 609. The first light 611 from the LED module 606 of the first light source escapes from the first light opening 6111.

The second light opening 609 is disposed at a surrounding side wall 6091 of the main housing 641.

In some embodiments, a light cover 6112 covers the first light opening 6111.

Figure 8:
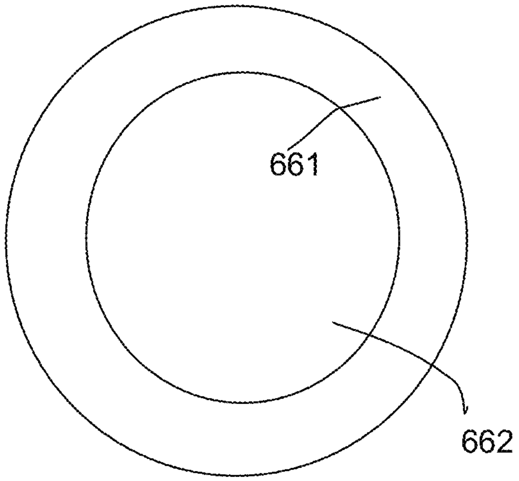
FIG. 8 shows a light cover disposed with an illumination ring.

In FIG. 8, a lens ring 661 disposed on peripheral edge of the light cover 662 for condensing a second light of the second light to form an illumination ring on the light cover.

For example, concave or convex lenses, one or a set of multiple micro lens, may be disposed on the peripheral edge of the light opening 662 to change how the light is escaped from the light cover, e.g. forming an illumination ring or diffused light pattern.

In some embodiments, the light cover has an optical structure distribution to smooth an overlapping area of a first light of the first light source and a second light of the second light source.

For example, white particles for changing light directions or absorbing light may be dispose in the light cover. Different density of the particles may change light pattern.

In some embodiments, a light intensity difference on any two area of the light cover is less than a light intensity of the first light of the light source.

In some embodiments, particles in the plastic material of the light cover have different ratios at different locations of the light cover to form the optical structure distribution.

Figure 9:
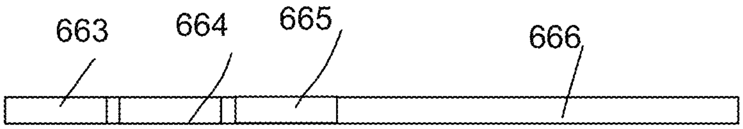
FIG. 9 shows a light cover with different regions of light parameters.

In FIG. 9, the light cover has multiple areas 663, 664, 665, with different density of the embedded particles to change different light pattern. By setting them in different areas help adjust the overall light pattern to appear before the user even if the light sources do not emit desired light pattern. Such raw light pattern may be adjusted by the light cover, e.g. doping with different density of particles in plastic material to create a desired light cover.

In FIG. 7, the lighting apparatus may also include a controller 604 for switching among a first mode, a second mode, and a third mode.

The controller 604 may be connected to manual physical switch 6041 that is disposed on the housing of the lighting apparatus or disposed on a wall and connected to the controller 604 via a wire.

In the first mode, the controller only activates the first light source.

In the second mode, the controller only activates the second light source.

In the third mode, the controller activates both the first light source and the second light source.

In some embodiments, in the third mode, the controller enables the first light source to generate a first light at a first light intensity, and enables the second light source to generate a second light at a second light intensity.

A difference between the first light intensity and the second light intensity is less than 20% of the first light intensity.

In some embodiments, in the third mode, a first color temperature of the first light of the first light source is substantially the same as a second color temperature of the second light of the second light source.

In the first mode and the second mode, the first color temperature of the first light of the first light source is different form the second color temperature of the second light of the second light source.

In some embodiments, the separating wall controls a first light of the first light source to a first spanning area.

The separating wall controls a second light of the second source to a second spanning area.

The second spanning area encloses the first spanning area.

In some embodiments, an overlapping area of the first spanning area and the second spanning area is a third spanning area.

A controller controls driving currents to the first light source and the second light source to keep light intensity levels of the first spanning area, the second spanning area and the third spanning area within an intensity range.

Figure 10:
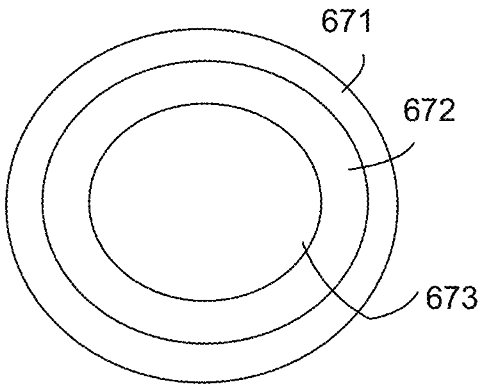
FIG. 10 shows region combination in an example.

FIG. 10 shows such an example, the first spanning area 673 and the third spanning area 672 are areas where the first light source emit light thereon.

The second spanning area 671 and the third spanning area 672 are areas where the second light source emit light thereon.

The third spanning area 672 is the overlapping area of the first light source and the second light source.

In some embodiments, the intensity range is less than 20% of the light intensity of the first light source.

In FIG. 7, the separating wall 607 has a top edge 6071 and a bottom edge 6072.

The bottom edge 6072 is attached to the light source plate 601.

The separating wall 607 extends from the bottom edge 6072 to the top edge 6071 with an enlarging profile (the surface of the separating wall).

In some embodiments, the slope becomes more smooth from the bottom edge to the top edge in the enlarging profile.

Figure 11:
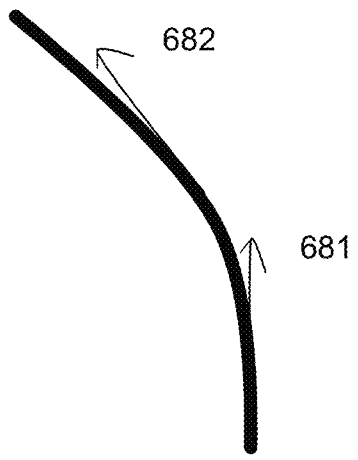
FIG. 11 shows slopes in a lateral side profile of a separating wall.

FIG. 11 shows such profile while in the bottom the slope 681 is larger than the slope 682 on a upper side.

In FIG. 7, the lighting apparatus may also include a driver module 603 disposed at center of the light source plate 601 for generating driving currents to the first light source 605 and the second light source 608.

In FIG. 7, a driver housing 602 covers the driver module 603.

An exterior surface of the driver housing has a reflective layer (the exterior surface of the housing 602) facing to the first light source 605.

Figure 12:
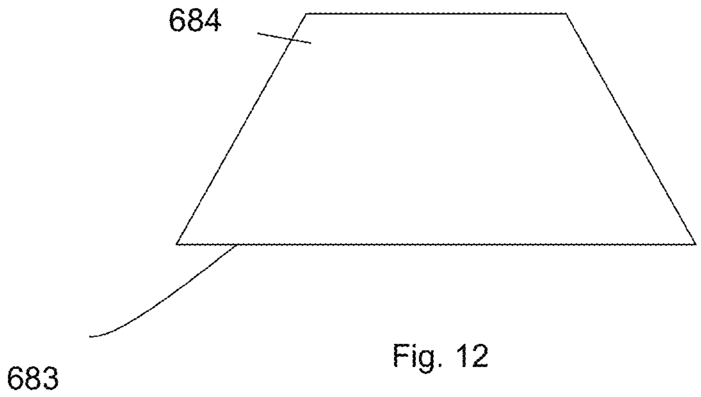
FIG. 12 shows an example of a driver housing.

In FIG. 12, a bottom edge 683 of a driver side wall of the driver housing is larger than a top edge 684 of the driver side wall of the driver housing so as to guide the light to move upwardly.

Please refer to FIGS. 1 to 6. In the embodiments of the present utility model, a ceiling lamp is provided, which includes a chassis 1, a lampshade 2, a partition shading piece 3, and a light-emitting source 4. The lampshade 2 is mounted on the chassis 1, forming an illumination cavity enclosed by the lampshade 2 and the chassis 1. The lampshade 2 also features a light-transmitting part. One side of the partition shading piece 3 is connected to the chassis 1, and the other side extends towards the light-transmitting part and is spaced apart from it. The partition shading piece 3 divides at least part of the illumination cavity near the chassis 1 into multiple light-emitting zones 7, with a light diffusion zone formed between the partition shading piece 3 and the light-transmitting part. The light diffusion zone and the light-emitting zones 7 are respectively interconnected. Multiple light-emitting sources 4 are arranged on the chassis 1, each located within the respective light-emitting zones, with at least one light-emitting source 4 in each zone.

The chassis 1 refers to a component that can bear the weight of the internal parts of the lamp and connect the lamp to the external environment. The shape and material of the chassis 1 are not limited herein. However, to save installation space, the chassis 1 can be plate-shaped, reducing its thickness and making the lamp more space-efficient.

The lampshade 2 is a thin-walled shell component with a certain internal space, designed to protect the internal parts of the lamp. The lampshade 2 may have a light-transmitting part in certain areas, such as transparent light-transmitting panels installed in mounting holes. Alternatively, the entire lampshade 2 can be made of transparent material, depending on the light transmission requirements.

The partition shading piece 3 refers to a plate-like component, annular component, or other thin components with opaque properties, made of materials such as metal, plastic, or ceramics. When the partition shading piece 3 is fixed to the chassis 1, a pressing structure is provided between them. The pressing structure can be secured by fasteners, clips, screw connections, or adhesives.

The illumination cavity refers to the space enclosed by the lampshade 2 and the chassis 1, housing essential components such as the light source module and the drive unit 9. The partition shading piece 3 divides the illumination cavity into multiple light-emitting zones, where the light-emitting zones refer to the areas separated by the partition shading piece 3's influence on light, not physical separation. The light diffusion zone is the gap between the side of the partition shading piece 12 and the lampshade 2.

The light-emitting source 4 refers to components that can emit light, such as bulbs or halogen tubes, or components like LED beads. When using LED beads or similar forms, a light source board 8 and other driving components are typically required to emit light, with connections following existing technology.

By forming an illumination cavity with the chassis 1 and the lampshade 2, and setting the partition shading piece 3 inside the cavity, where one side is fixed to the chassis 1 and the other side extends towards the light-transmitting part, multiple light-emitting zones 7 are created. The light diffusion zone allows light to pass through and overlap at the edges of adjacent light-emitting zones when light-emitting sources 4 in adjacent zones are lit simultaneously, improving the overall lighting effect and reducing dark areas.

When only one light-emitting source 4 in a light-emitting zone 7 is lit, its light will pass through the light diffusion zone into the adjacent light-emitting zone 7, creating a gradient effect and enhancing the lamp's visual appeal. In one embodiment, as shown in FIGS. 2 to 4, the partition shading piece 3 is a rotational body structure, dividing the illumination cavity into an inner light-emitting zone and an outer light-emitting zone, with the inner zone as the primary zone and the outer zone as the secondary zone.

Figure 1:
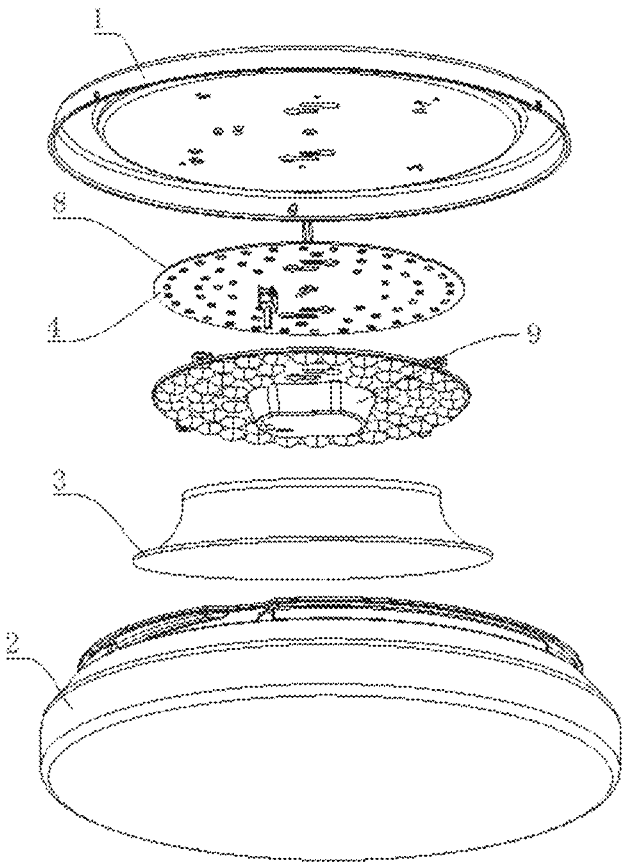
FIG. 1 illustrates an exploded view of a lighting apparatus embodiment.
Figure 2:
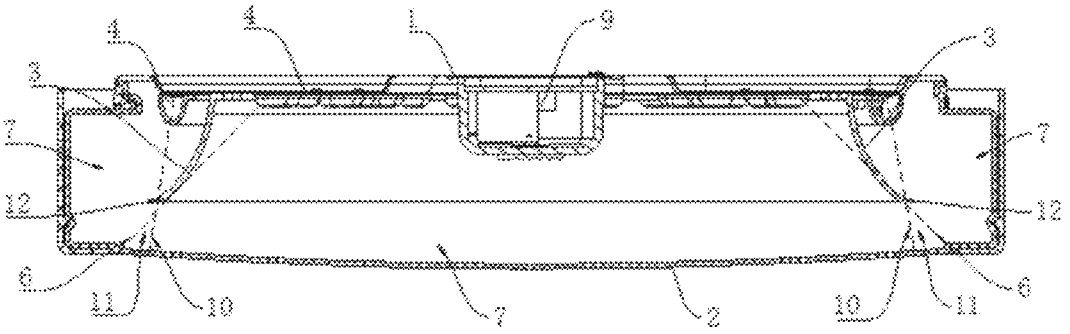
FIG. 2 illustrates a side view of a panel light embodiment.
Figure 3:
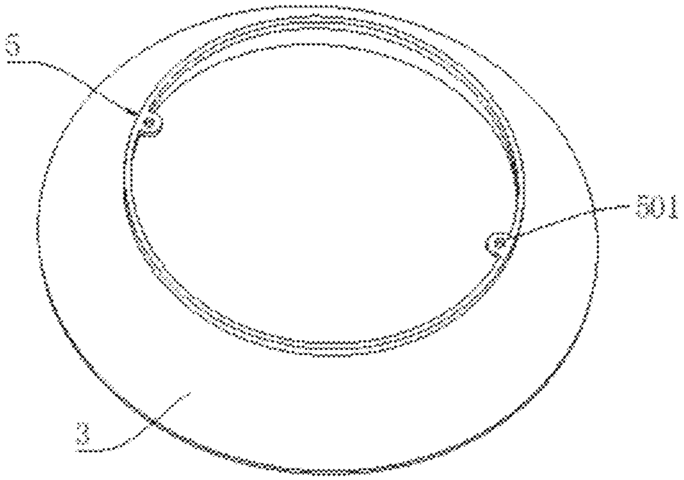
FIG. 3 illustrates an example of the separating wall.
Figure 4:
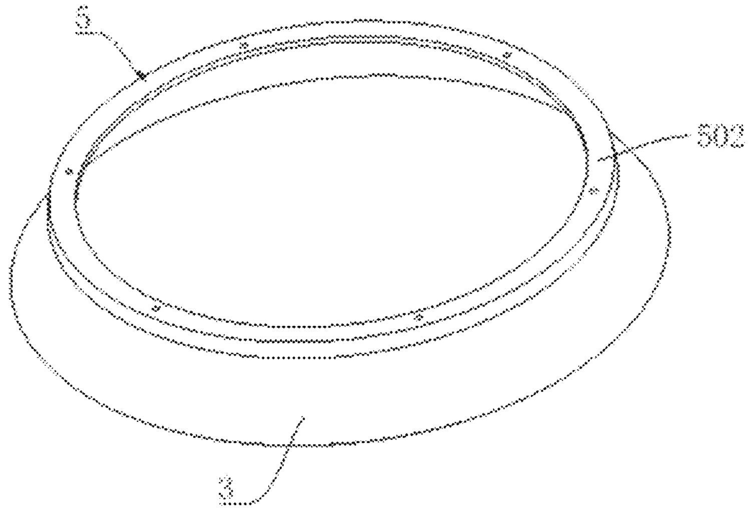
FIG. 4 illustrates another view of the example in FIG. 3.

In one embodiment, as shown in FIGS. 2 to 4, the partition shading piece 3 is a rotational body structure that divides the illumination cavity into an inner light-emitting zone and an outer light-emitting zone. In this embodiment, the rotational body structure generally refers to cylindrical or annular components, with only one partition shading piece 3 encircling into a main cylinder or annular shape. One end of the partition shading piece 3 is connected to the chassis 1, and the other end is spaced apart from the inner wall of the lampshade 2. The partition shading piece 3 divides the illumination cavity into two light-emitting zones: the inner light-emitting zone located inside the partition shading piece 3 and the outer light-emitting zone surrounding the inner zone. The inner light-emitting zone is circular as the main light-emitting zone, and the outer light-emitting zone is annular as the secondary light-emitting zone. This form of partition shading piece 3 allows for a more reasonable division of space within the illumination cavity, improving the lighting effect of the lamp.

The multiple light-emitting sources 4 can be arranged according to the shapes of the inner and outer light-emitting zones. For example, the light-emitting sources 4 in the outer zone can be arranged in an annular form around the inner zone, and the light-emitting sources 4 in the inner zone can form a circular pattern, enhancing the lamp's lighting effect and functionality.

In another embodiment, as shown in FIGS. 2 to 4, the partition shading piece 3 has a variable diameter structure, with its diameter gradually increasing from the side connected to the chassis 1 to the other side. Specifically, the partition shading piece 3 can divide the illumination cavity into an inner light-emitting zone and an outer light-emitting zone, with the inner zone generally serving as the main light-emitting zone and the outer zone as the secondary light-emitting zone. The axis of the partition shading piece 3 is set along the direction of light emission, allowing its overall shape to align with the direction of light projection. This setup can reduce light blockage by the partition shading piece 3, minimizing light loss from the light-emitting sources 4 and improving lighting intensity. Furthermore, the diameter of the partition shading piece 3 increases from one side to the other, forming a conical structure that maximizes the light-emitting area of the main zone and enhances the lamp's lighting effect.

In one embodiment, as shown in FIG. 2, the sidewall of the partition shading piece 3 curves outward towards its axis. Specifically, to make the lamp lighter, the partition shading piece 3 is generally made of plastic through injection molding. The sidewall of the partition shading piece 3 curves outward, forming a trumpet shape that better conforms to stress requirements and reduces the likelihood of deformation during the cooling process after injection molding.

Figure 5:
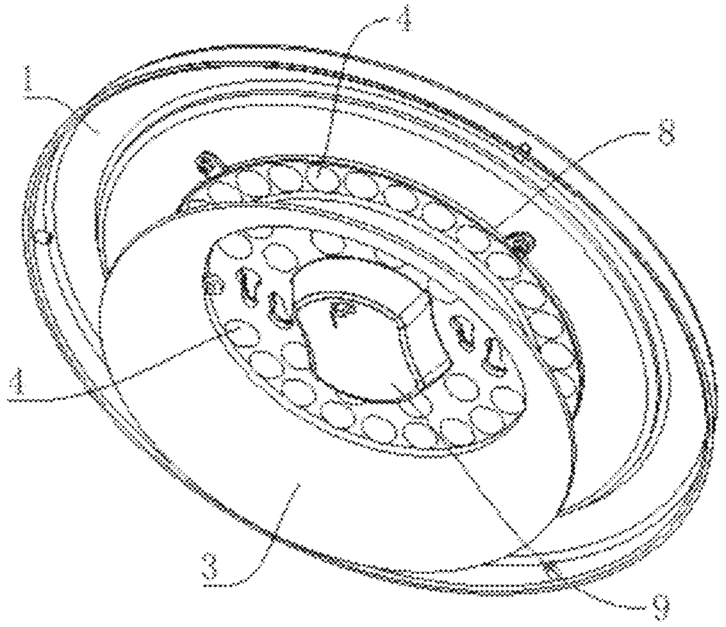
FIG. 5 illustrates a view of an example showing a separating wall installed on a light source plate.

In another embodiment, as shown in FIGS. 3 and 5, the partition shading piece 3 includes a fixing part 5 that connects it to the chassis 1. Specifically, the fixing part 5 refers to a plate-like or block-like component with a certain volume, set on the partition shading piece 3. Given that the partition shading piece 3 is a thin plate or annular component, to prevent it from affecting the light emission of the light-emitting sources 4, the partition shading piece 3 is typically installed with a small contact area with the chassis 1, which may cause instability. The fixing part 5 increases the contact area between the partition shading piece 3 and the chassis 1, providing space for a pressing structure, thereby securing the partition shading piece 3 more firmly.

In one embodiment, as shown in FIG. 3, the fixing part 5 includes multiple fixing ears 501 on the sidewall of the partition shading piece 3, with the side of the fixing ears 501 abutting the chassis 1. Specifically, the fixing ears 501 have mounting planes to ensure stable contact with the chassis 1. Generally, multiple fixing ears 501 are spaced along the circumference or length of the partition shading piece 3, ensuring even force distribution after installation. The fixing ears 501 can be set on either the inner or outer wall of the partition shading piece 3, increasing the contact area with the chassis 1 and providing space for the pressing structure, thus securing the partition shading piece 3 more firmly.

In an optional embodiment, the fixing ears 501 have mounting holes for fasteners to secure them to the chassis 1. Specifically, the mounting holes and fasteners form the previously described pressing structure, with matching threaded holes on the chassis 1. Fasteners, such as screws or screw-nut combinations, secure the fixing ears 501 to the chassis 1, ensuring a convenient and secure connection.

In another optional embodiment, clamping springs can be set on the chassis 1. One end of the clamping spring is connected to the chassis 1, while the other end is spaced apart, forming a clamping gap for the fixing ears 501. Specifically, clamping springs are elastic strip or rod components matched to the positions of the fixing ears 501 on the chassis 1. When installing the partition shading piece 3, the fixing ears 501 can be inserted into the clamping gap through rotation, making installation easier. The clamping springs' elasticity secures the fixing ears 501 after insertion.

In one embodiment, as shown in FIG. 4, the fixing part 5 includes a flange plate 502 set along the length of the partition shading piece 3. Specifically, the flange plate 502 is a long plate-like component with constant width dimensions, set along the length or circumference of the partition shading piece 3. The flange plate 502 can be set on either the inner or outer wall of the partition shading piece 3. Similar to the fixing ears, the flange plate 502 increases the contact area with the chassis 1 and provides space for the pressing structure, securing the partition shading piece 3 more firmly and conveniently.

In one embodiment, as shown in FIG. 5, the light-emitting sources 4 are all located on a single light source board 8, positioned between the partition shading piece 3 and the chassis 1. Specifically, the illumination cavity also houses a drive unit 9, integrated with the light-emitting sources 4 on a light source board 8 to form a DOB (Driver on Board) integrated light source module. The light source board 8 is installed on the chassis 1, and the partition shading piece 3 is then connected to the light source board 8, dividing the light-emitting sources 4 into different zones. The drive unit 9 controls the light-emitting sources 4 in various zones, simplifying the overall lamp structure and improving assembly efficiency.

Figure 6:
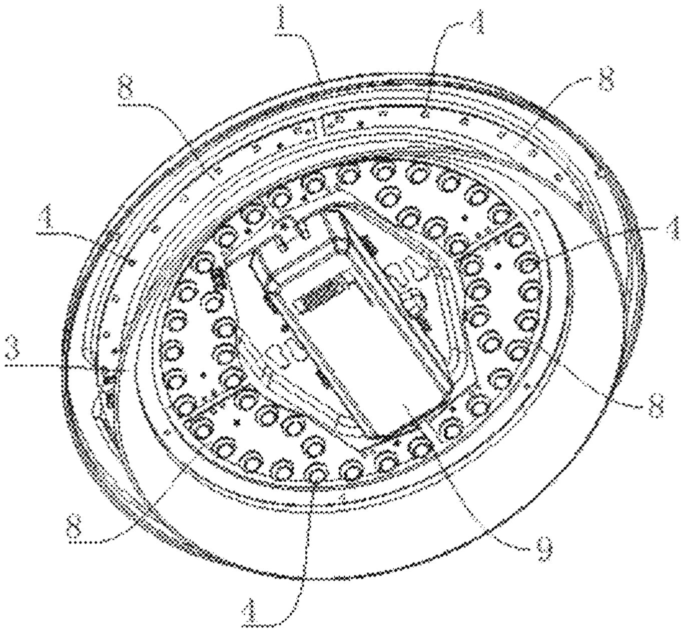
FIG. 6 illustrates another view of the example in FIG. 5.

In another embodiment, as shown in FIG. 6, the ceiling lamp includes multiple light source boards 8 with light-emitting sources 4 distributed across them. Each light-emitting zone contains at least one light source board 8, positioned on the side of the partition shading piece 3 after installation. Each light source board 8, with its light-emitting sources 4, forms a light source module, with modules set in different light-emitting zones 7. Multiple light source modules can have separate drive units 9. To save costs, a single drive unit 9 can control different light source modules using an independent power/switch isolation control scheme. This allows flexible arrangement of light source boards 8 according to the shape of the light-emitting zones, facilitating changes in light-emitting source 4 placement and simplifying the internal lamp structure.

In an optional embodiment, the light-emitting sources 4 are covered with light-transmitting covers or lens structures, softening the light and reducing glare. The light-transmitting covers or lenses can be individual for each light-emitting source 4 or matched to the arrangement of the light-emitting sources 4 on the light source board 8. Lens structures can also be individual or set on a mounting plate with multiple lenses corresponding to the light-emitting sources 4, simplifying assembly.

In another optional embodiment, a decorative ring is set outside the lampshade 2. The decorative ring can prevent side light leakage and enhance the lamp's appearance, improving its decorative value.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a first light source;

a second light source;

a light source plate, wherein the light source plate has a first area and a second area on a front side of the light source plate, wherein the first light source is placed on the first area of the light source plate, wherein the second light source is placed on the second area of the light source plate;

a controller for switching among a first mode, a second mode, and a third mode, wherein in the first mode, the controller only activates the first light source, wherein in the second mode, the controller only activates the second light source, wherein in the third mode, the controller activates both the first light source and the second light source, wherein in the third mode, the controller enables the first light source to generate a first light at a first light intensity, and enables the second light source to generate a second light at a second light intensity, wherein a difference between the first light intensity and the second light intensity is less than 20% of the first light intensity; and a separating wall placed above the front side of the light source plate for separating the first area and the second area and for defining a first light spanning area of the first light source and a second light spanning of the second light source.

2. The lighting apparatus of claim 1, wherein the separating wall has a reflection on an inner side facing to the first light source.

3. The lighting apparatus of claim 1, wherein a main housing encloses the light source plate, and the separating wall, wherein the main housing has a first light opening and a second light opening, wherein the first light opening is substantially perpendicular to the second light opening.

4. The lighting apparatus of claim 3, wherein a second light of the second light source escapes through the second light opening, wherein the second light opening is disposed at a surrounding side wall of the main housing.

5. The lighting apparatus of claim 3, wherein a light cover covers the first light opening.

6. The lighting apparatus of claim 5, wherein a lens ring disposed on peripheral edge of the light cover for condensing a second light of the second light to form an illumination ring on the light cover.

7. The lighting apparatus of claim 5, wherein the light cover has an optical structure distribution to smooth an overlapping area of a first light of the first light source and a second light of the second light source.

8. The lighting apparatus of claim 7, wherein a light intensity difference on any two area of the light cover is less than a light intensity of the first light of the light source.

9. The lighting apparatus of claim 7, wherein particles in a plastic material of the light cover have different ratios at different locations of the light cover to form the optical structure distribution.

10. The lighting apparatus of claim 1, wherein in the third mode, a first color temperature of the first light of the first light source is substantially the same as a second color temperature of the second light of the second light source, wherein in the first mode and the second mode, the first color temperature of the first light of the first light source is different form the second color temperature of the second light of the second light source.

11. The lighting apparatus of claim 1, wherein the separating wall controls a first light of the first light source to a first spanning area, wherein the separating wall controls a second light of the second source to a second spanning area, wherein the second spanning area encloses the first spanning area.

12. The lighting apparatus of claim 11, wherein an overlapping area of the first spanning area and the second spanning area is a third spanning area, wherein a controller controls driving currents to the first light source and the second light source to keep light intensity levels of the first spanning area, the second spanning area and the third spanning area within a predetermined intensity range.

13. The lighting apparatus of claim 12, wherein the intensity range is less than 20% of the light intensity of the first light source.

14. The lighting apparatus of claim 1, wherein the separating wall has a top edge and a bottom edge, wherein the bottom edge is attached to the light source plate, wherein the separating wall extends from the bottom edge to the top edge with an enlarging profile.

15. The lighting apparatus of claim 14, wherein a slope becomes more smooth from the bottom edge to the top edge in the enlarging profile.

16. The lighting apparatus of claim 1, further comprising a driver module disposed at center of the light source plate for generating driving currents to the first light source and the second light source.

17. The lighting apparatus of claim 1, wherein a driver housing covers the driver module, wherein an exterior surface of the driver housing has a reflective layer facing to the first light source.

18. The lighting apparatus of claim 1, wherein a bottom edge of a driver side wall of the driver housing is larger than a top edge of the driver side wall of the driver housing.

* * * * *